July 12, 1966   W. E. GRAHAME   3,260,477

FLAP ASSEMBLY FOR AIRCRAFT

Filed Jan. 31, 1964   2 Sheets-Sheet 1

INVENTOR.
WILLIAM E. GRAHAME
BY
ATTORNEY

July 12, 1966 W. E. GRAHAME 3,260,477
FLAP ASSEMBLY FOR AIRCRAFT
Filed Jan. 31, 1964 2 Sheets-Sheet 2
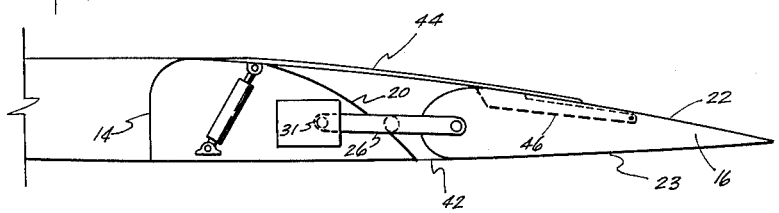
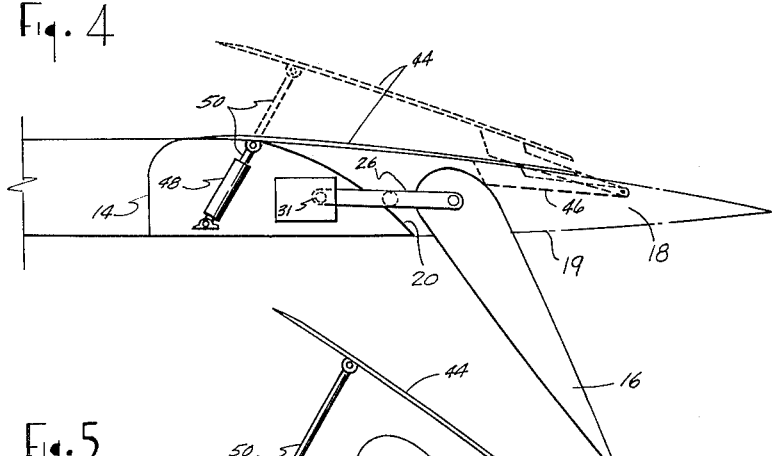
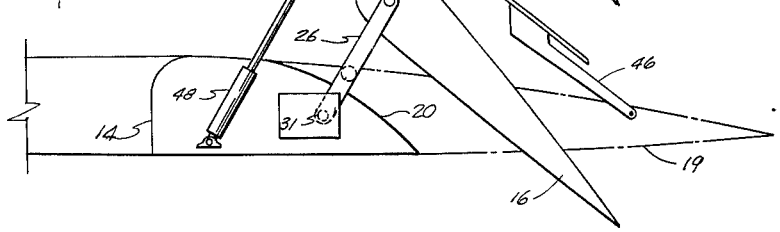
INVENTOR.
WILLIAM E. GRAHAME
BY
ATTORNEY United States Patent Office 3,260,477
Patented July 12, 1966

3,260,477
FLAP ASSEMBLY FOR AIRCRAFT
William E. Grahame, 6939 S. Prince Way, Littleton, Colo.
Filed Jan. 31, 1964, Ser. No. 341,611
7 Claims. (Cl. 244—12)

This invention relates generally to aircraft; and more particularly relates to an aerodynamic flap structure for use in cooperation with a lift fan and the like in aircraft capable of vertical or short take-off and landing as well as forward flight, such aircraft being hereinafter referred to as vertical take-off and landing, or VTOL, aircraft.

In VTOL aircraft, lift fans customarily are positioned in the wing or fuselage for the purpose of imparting lift or a vertical component of thrust for vertical take-off, hovering, and for transition between vertical and horizontal flight. In transition, and especially when the fan is positioned in a section of airfoil contour, such as, the wing, it has been found that the airstream will produce a net upward force forwardly of the fan and a net downward force rearwardly of the fan, the effect of which is to develop a pitch-up moment, i.e., a moment tending to cause the plane to nose-up in flight. This is due in large part to the effect of fan operation on the airstream which in altering the flow of air will form negative pressure areas along the upper surface portion forwardly of the fan and along the lower surface portion behind the fan; and the resultant moment produced has been found to be highly detrimental to the efficient performance and stability of the aircraft during transitional flight.

To overcome the pitch-up moment developed, it is proposed to position a flap behind the fan with a control mechanism for shifting the flap and controlling its angle of attack in relation to the airstream flowing past the fan in such a way as to counteract the pitch-up moments, and as a result to materially reduce the total pitch-up moment developed about the fan axis. Moreover, it is proposed to so construct and arrange the flap in relation to the lift fan as to contribute to more effective performance of the fan and aircraft in vertical and horizontal flight, as well as in transition. In this relation, the aerodynamic flap structure devised in accordance with the present invention may be incorporated into existing aircraft without modification of the lift fan or aircraft structure itself and will cooperate with the fan or other propulsive units in all stages of flight in such a manner as to materially improve the stability and controllability of the aircraft.

Accordingly, it is a principal and foremost object of the present invention to improve the flight characteristics of VTOL aircraft especially in transition from vertical to horizontal flight, and specifically to reduce the pitch-up moments normally developed in transitional flight in a novel and efficient manner.

It is another object of the present invention to provide for an improved aerodynamic flap device which is conformable for use in existing, conventional VTOL aircraft employing lift fans and the like and wherein the aerodynamic flap is so constructed and arranged as to develop its own pitching moment which will counteract the pitch-up moment normally developed by the airstream during transition from vertical to horizontal flight.

It is a further object of the present invention to provide for an aerodynamic flap assembly arranged in trailing relation to a lift fan positioned in the wing of a VTOL aircraft wherein the flap is rotatable to the desired flap angle and is further movable to an elevated position above the wing in transitional flight so as to be acted upon directly by the airstream to counteract the pitch-up moments normally developed during transition; and furthermore to so position the flap in relation to the path of airflow rearwardly of the fan as to impart increased lift to the aircraft while minimizing the overall pitch-up moment with a negligible drag effect.

In accordance with the present invention, an aerodynamic flap has been designed for use in conjunction with lift fans positioned in the fixed wing sections of an aircraft, the flap being disposed in a recess along the trailing edge of the wing directly behind the lift fan and in the downflow of air produced by the fan in flight. In this position, the flap may be deflected in a conventional manner during vertical and horizontal flight, and in transitional flight may be elevated as well as deflected to the desired angle whereby to develop a pitching moment which will effectively counteract the pitch-up moment normally produced by the airstream. Moreover, in a preferred form of the present invention, a movable cover plate is positioned over the flap to form a smooth closure along the upper wing surface for the purpose of increasing flap effectiveness during normal flight, and the cover plate being further movable to permit elevation of the flap into raised position above the wing surface in transitional flight.

The above and other objects, advantages and features of the present invention will become more readily understood and appreciated from a consideration of the following detailed description of a preferred form of invention taken together with the accompanying drawings, in which:

FIGURE 3 is a schematic sectional view showing the preferred form of flap assembly in its neutral or normal flight position.

FIGURE 4 is a schematic sectional view showing the flap in a fully deflected position in trailing relation to the wing portion; and FIGURE 5 is a schematic sectional view illustrating the relationship between parts when the flap is moved to an elevated position behind the lift fan during transitional flight.

Figure 1:
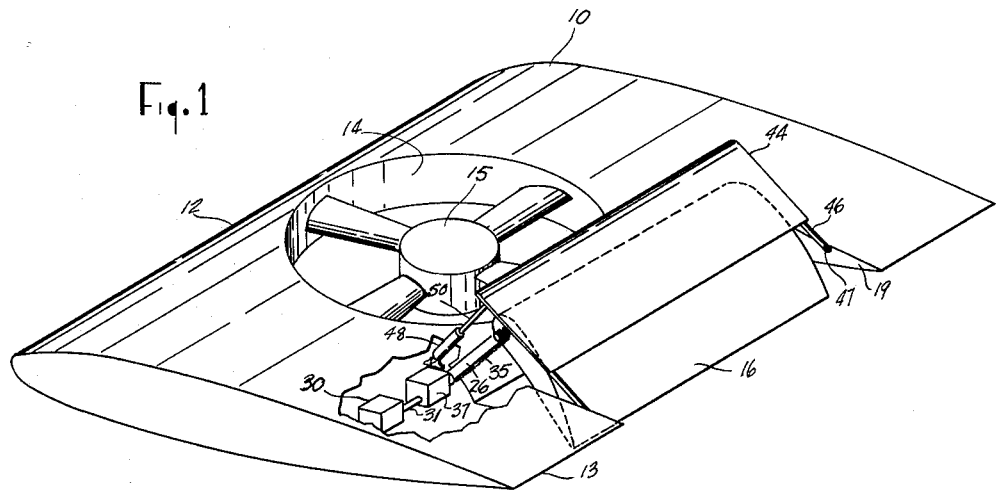
FIGURE 1 is a fragmentary view of a wing of an aircraft incorporating a lift fan and illustrating a preferred form of aerodynamic flap assembly constructed according to the present invention, and with the flap being shown in an elevated position relative to the wing portion and lift fan.
Figure 2:
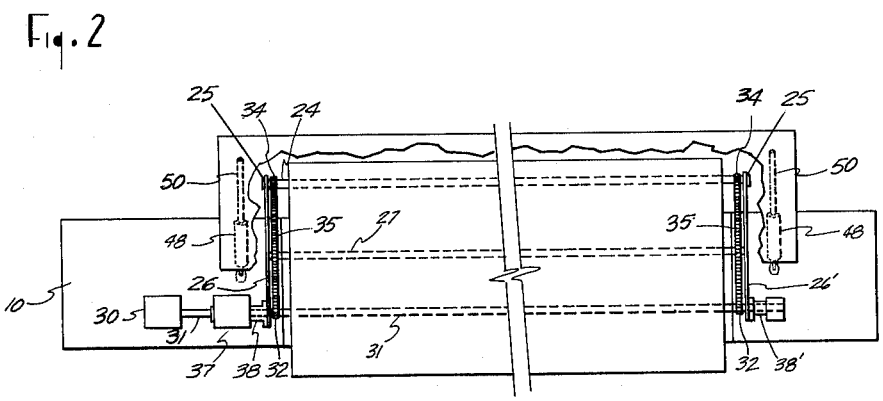
FIGURE 2 is a somewhat schematic view of a representative form of control mechanism utilized to actuate the flap assembly shown in FIGURE 1.

Referring in detail to the drawings, a fragmentary portion of a fixed wing 10 for an aircraft is shown having a leading edge 12, a trailing edge 13, and a vertical duct 14 for disposition of a lift fan designated at 15 therein. The fan 15 is merely representative of various different conventional forms of lift fans and is shown mounted for rotation within the duct about a vertical axis to impart lift or vertical thrust to the aircraft during take-off, hover, and transition between vertical and horizontal flight.

In accordance with the present invention, a flap 16 is positioned in trailing relation to the lift fan so as to be in the downflow of the airstream during transitional flight. Most desirably, the flap is of generally airfoil configuration and is stationed in a recess 18 formed in the trailing portion of the wing directly behind the fan duct, the recess having spaced vertical side edges 19 and a forward edge 20, the latter curving rearwardly and downwardly from the upper surface of the wing. The flap 16 is preferably of airfoil contour and is positioned to lie within the recess with its upper surface 22 in normal alignment with the upper surface of the wing and its lower surface 23 in normal alignment with and forming an extension of the lower wing surface.

In order to control angular deflection or tilting of the flap, the flap is rotated by a shaft 24 extending longitudinally through the flap adjacent to its leading edge, and opposite ends of the shaft 24 are supported in journaled relation in bearings 25 at the outer free ends of link arms 26 and 26', the link arms being interconnected by a cross member 27. To rotate the shaft and connected flap, a drive mechanism, represented at 30, is located within the wing to one side of the flap and has a drive shaft 31 traversing the length of the recess 18 for rotating a pair of drive sprockets 32 which are keyed to the drive shaft 31 inwardly of the respective link arms 26 and 26'. Follower sprockets 34 are mounted for rotation on the projecting ends of the shaft 24 opposite the drive sprockets, and endless chains 35 are trained over each of the aligned drive and follower sprockets to transmit rotation from the drive shaft 31 to the shaft 24. Thus, it will be seen that the flap may be deflected to the desired angle of attack relative to the airstream through actuation of the drive mechanism 30 whereby to impart rotation to the drive shaft 31 and connected shaft 24.

Independently of deflection or tilting of the flap, a flap elevator mechanism is utilized to raise and lower the flap in relation to the wing and lift fan. As represented, the flap elevator mechanism may consist of a suitable drive motor 37 and a drive sleeve 38 extending from the motor in outer spaced concentric relation to the drive shaft 31. The link arm 26 is connected to the inner end of the drive sleeve 38 whereupon rotation of the drive sleeve the link arm 26 is operative to swing the flap between a position, as shown in FIGURE 3, wherein the flap lies within the recess 18 to a position, as shown in FIGURE 5, wherein the flap is raised and advanced forwardly over the wing surface so as to be located directly behind and somewhat above the fan duct 14. The opposite link arm 26' is connected to a follower sleeve 38' journaled in outer concentric relation to the drive shaft 31 so as to support the shaft 24 and the side of the flap opposite the link arm 26 for movement in response to activation of the elevator mechanism.

In the elevated position, also, the flap may be deflected by the drive mechanism 30 in order to control its angle of attack in relation to the airstream, and specifically so that the flap will be acted upon by the airstream to produce a pitching moment which will counteract that normally imparted to the wing in transition from vertical to horizontal flight. As hereinbefore described, negative pressure areas are normally formed along the upper surface of the wing forwardly of the lift fan and the lower surface of the wing directly behind the lift fan during transitional flight, and the effect of which is to develop a high pitch-up moment about the fan axis. By positioning the flap in elevated relation directly behind the fan and in the downflow of air produced by the fan during transition, the airstream will therefore act upon the flap so as to produce a pitch-down moment which will effectively counteract the pitch-up moment developed on the wing and thus to materially reduce the resultant moment developed about the fan axis. The most suitable angle of attack for the flap in the raised position will of course depend in large extent on flight speed and the attitude of the craft in transition from vertical to horizontal flight.

It will be noted that a gap or slot 42 is formed between the leading edge of the flap and forward edge 20 of the recess portion and, in the preferred form of invention, a cover plate 44 is disposed to overlie the gap along the upper surface of the wing and flap so as to form a smooth closure and prevent the passage of air therethrough. Necessarily, the cover plate 44 must be movable upwardly and away from the upper surface of the wing to permit movement of the flap into the raised position and this may be suitably accomplished by means of brackets 46 pivotally connecting the sides of the cover plate to the opposite side edges 19 of the recess as designated at 47 so as to provide for upward and rearward pivotal movement of the cover plate away from the upper surface of the wing. The cover plate is preferably of airfoil configuration and may be actuated by suitable means such as hydraulic cylinders, represented at 48; the cylinders are secured at one end in pivotal relation to the wing portion and include cylinder rods 50 pivotally connected to opposite sides of the forward or leading edge of the cover plate 44. It will be seen that when the cover plate is raised by outward extension of the cylinder rods 50, as shown in dotted form in FIGURE 4, it will be operative to develop a pitch-down moment in much the same manner as the raised flap. Accordingly, as one permissible variation within the scope of the present invention, the cover plate may be employed independently of the flap to develop a pitching moment counteracting that produced on the wing during transitional flight and thus eliminate the necessity of raising the flap through the flap elevator mechanism.

In practice, the flap may be operated as a conventional plain flap by deflecting it about its own axis of rotation through the shaft 24. For example the flap may be rotated downwardly as shown in FIGURE 4 to any desired angle for conventional take-offs and landings; and during the initial hovering condition, the flap may be rotated to its point of maximum deflection. Subsequently, as forward speed commences, the cover plate 44 is raised by means of the cylinders 48, then the flap 16 is displaced upwardly by the flap elevator mechanism into spaced relation above the wing surface, as shown in FIGURE 5. At this position the flap may be deflected to the desired flap angle and as forward transitional speed in increased variations may be made in plate angle, flap angle and elevation to compensate for changes in airflow characteristics. It is to be noted in this relation that when the flap is raised and deflected to the desired angle it will be acted upon by the airstream to develop a net upward force on the flap assembly.

In forward flight, the reverse sequence is followed with the flap being lowered into its original disposition within the wing followed by retraction and lowering of the cover plate into alignment with the wing surface. Moreover, in reverse transition from horizontal to vertical flight, the flap may be deflected in a conventional manner, as shown in FIGURE 4, to reduce the speed of the aircraft.

In the relationships described, the flap will contribute materially to stability of the aircraft during transition while producing increased lift and imposing a minimum of drag on the craft. Furthermore, it will be noted that the preferred form of flap device merely extends for a limited distance along the wing corresponding to the diameter of the lift fan, but nevertheless will have a pronounced effect on the overall pitching moment during transition in that it is positioned directly behind the fan section in the downflow of the airstream.

It will be evident from the foregoing that various changes may be made in the size, shape and particular arrangement of parts comprising the present invention; thus, for example, the control mechanism employed for rotation and elevation of the flap may assume various forms; also the cover plate and its actuating mechanism are merely representative of various types of movable closures which may be utilized in cooperation with the flap. Accordingly, while there has been illustrated and described what is now considered to be the preferred form of invention, it is to be understood that the invention is not limited to the particular embodiment as set forth, but that various changes and modifications may be made therein without departing from the spirit and scope of the invention as defined by the appended claims.

What is claimed is:

1. In an aircraft, thrust generating means housed within the aircraft for imparting vertical thrust thereto, a flap positioned rearwardly of said thrust generating means to traverse the path of airstream flow past said thrust generating means, tilting means for deflecting said flap to control its angle of attack in relation to the airstream, and flap elevating means being operative to raise said flap to an elevated position with the lower surface of said flap traversing the path of airflow rearwardly and above said thrust generating means.

2. In an aircraft according to claim 1, said thrust generating means being housed within an airfoil shaped section of the aircraft and said flap being arranged for extension along the trailing portion of said section rearwardly of said thrust generating means.

3. In an aircraft, thrust generating means housed within an airfoil shaped section for imparting vertical thrust to the aircraft, a flap assembly disposed rearwardly of said thrust generating means including a flap and tilting means for deflecting said flap to a predetermined angle of attack, a movable closure member disposed for extension in substantial alignment with the upper surface of the airfoil shaped section, and elevating means for selectively raising said closure member into upwardly projecting relation to the upper surface of the airfoil section so as to be acted upon by the airstream when in transition from vertical to horizontal flight and said flap assembly further including flap elevating means for raising said flap through the space formed between said closure and the upper surface of the airfoil section when said closure is in upwardly projecting relation to the upper surface of the airfoil section.

4. In an aircraft having thrust generating means housed within a wing section to impart a vertical thrust to the aircraft, a flap disposed along the trailing edge of the wing rearwardly of said thrust generating means, a cover plate disposed over said flap in normal alignment with the upper surface of said wing, tilting means for deflecting said flap about an axis of rotation through said flap, and elevating means being operative sequentially to elevate said cover plate and said flap above the upper surface of the wing with the lower surface of said flap being acted upon by the airstream across the trailing edge of the wing.

5. In a vertical take-off and landing aircraft having a lift fan housed within a wing section to impart vertical thrust to the aircraft, a flap disposed in a recess along the trailing edge of the wing rearwardly of said lift fan, a movable cover plate being pivotally connected to the wing section and being normally disposed to overlie the gap formed between said flap and the wing section, tilting means for deflecting said flap about an axis of rotation through said flap, plate elevating means for raising said cover plate above the wing section, and flap elevating means for raising said flap into an elevated position rearwardly and above said lift fan when said cover plate is in the raised position.

6. In a vertical take-off and landing aircraft having a lift fan housed within a wing section of the aircraft, a flap of generally airfoil configuration, flap elevating means supporting said flap within a recess along the trailing edge of the wing rearwardly of said lift fan, tilting means for deflecting said flap about an axis of rotation extending through said flap, a cover plate disposed to overlie the gap formed between the recess and said flap in normal alignment with the upper surface of said wing, plate elevating means for raising said plate to a raised position above the wing and said flap elevating means being operative to raise said flap above the upper surface of the wing with the lower surface of said flap being acting upon by the airstream flow across the trailing edge of the wing.

7. In a vertical take-off and landing aircraft according to claim 6, said flap elevating means including link arms connected to said flap for swinging said flap forwardly and upwardly into the elevated position in response to actuation of said flap elevating means.

References Cited by the Examiner

UNITED STATES PATENTS

| 2,254,196 | 8/1941 | Fowler | 244—42 X |
| 2,723,091 | 11/1955 | Davies | 244—113 |
| 3,080,137 | 3/1963 | Hurel | 244—12 |
| 3,131,873 | 5/1964 | Sanders | 244—12 |
| 3,161,374 | 12/1964 | Allred | 244—12 |

FOREIGN PATENTS

| Ad. 51,663 | 12/1942 | France. |
| 577,779 | 5/1946 | Great Britain. |

MILTON BUCHLER, *Primary Examiner.*

FERGUS S. MIDDLETON, *Examiner.*

G. P. EDGELL, L. C. HALL, *Assistant Examiners.*